Figure 1:
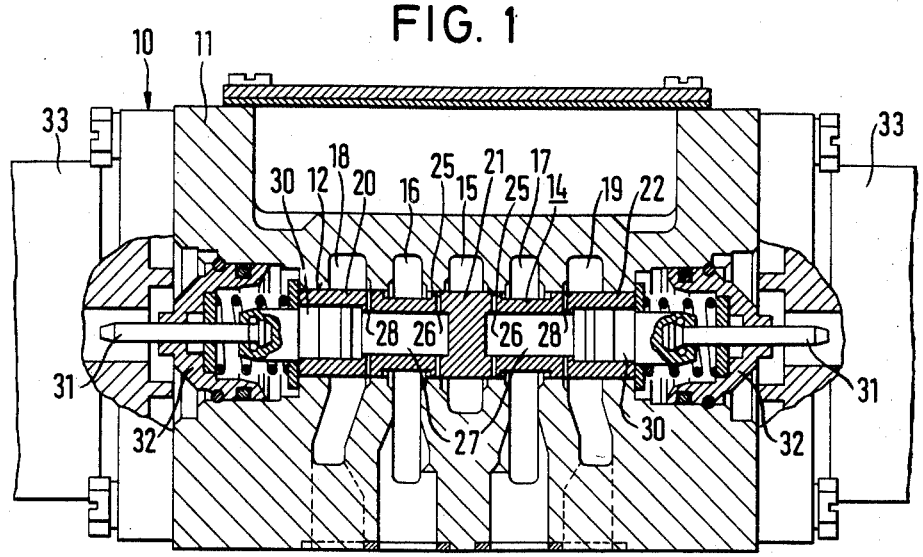

United States Patent [19]

Rotte et al.

[11] Patent Number: 4,566,479

[45] Date of Patent: Jan. 28, 1986

[54] SPOOL MEMBER OF A MULTI-WAY-VALVE

[75] Inventors: Hermann J. Rotte, Partenstein; Emil Bögl, Sulz-Hopfau, both of Fed. Rep. of Germany

[73] Assignee: Mannesmann Rexroth GmbH, Fed. Rep. of Germany

[21] Appl. No.: 584,715

[22] Filed: Feb. 29, 1984

[30] Foreign Application Priority Data

Mar. 14, 1983 [DE] Fed. Rep. of Germany ....... 3309065

[51] Int. Cl.⁴ .............................................. F15B 13/04
[52] U.S. Cl. ................................. 137/312; 137/625.68
[58] Field of Search ............................ 137/312, 625.68

[56] References Cited

U.S. PATENT DOCUMENTS 3,516,445  6/1970  Skeates ......................... 137/312 X 3,707,984  1/1973  Bantz ............................... 137/312

FOREIGN PATENT DOCUMENTS 1245662  7/1967  Fed. Rep. of Germany .

*Primary Examiner*—Gerald A. Michalsky
*Attorney, Agent, or Firm*—Harness, Dickey & Pierce

[57] ABSTRACT

In the spool member of a multi-way-valve leakage of pressure fluid from the inlet port to the operating ports and a corresponding pressure increase in a consumer are prevented by annular grooves and radial bores through which pressure fluid leaking from the inlet is discharged to the reservoir. The radial bores are provided in the spool member so that the land relief between the pressure inlet port and the operating port is achieved via the spool member, and the housing of the multi-way-valve may remain unchanged.

2 Claims, 2 Drawing Figures

SPOOL MEMBER OF A MULTI-WAY-VALVE

DESCRIPTION

The invention relates to a spool member for a multi-way-valve.

In order to discharge pressure fluid which has leaked from the inlet port into adjacent gaps between the housing and the spool member of a multi-way-valve, it has become known (German specification No. 12 45 662) to provide annular grooves in the area of the gaps, which annular grooves are connected to the reservoir via passages when the spool member is in its center position. The passages are provided in the housing. In order to discharge leakage pressure fluid to the reservoir, the housing must be provided with a plurality of passages, which increases the manufacturing costs. Furthermore, correspondingly wide housing lands between the control spaces will be required.

An undesired pressure increase in the operating ports of a multi-way-valve may be prevented in a known manner by a two-position spool provided between the pressure fluid source and the multi-way-valve and serving to connect the inlet port of the multi-way-valve either to the pressure fluid source or the reservoir. The two-position spool also increases the manufacturing costs.

It is an object of the present invention to prevent any leakage of pressure fluid from the inlet port to the operating ports effectively and in a most economical manner when the spool member is in its closing position.

The spool member of the present invention is defined in claim 1.

A substantial advantage of the present invention is that the housing of the claimed multi-way-valve requires only the known connections for the pressure fluid source, the consumer and the reservoir, no changes, in particular no changes of the standardized valve ports, being necessary. In particular passages and connections in the housing which serve to discharge leakage fluid and which are difficult to machine due to their small diameters may be omitted. It is only the spool member which is provided with blind bores into which radial bores open, by which radial bores leakage pressure fluid may be discharged to the reservoir. The invention is particularly useful in connection with a symmetrical 4/2 or 4/3-way-valve for directional control of a servo motor, in which symmetrically to a central inlet port connected to the pressure source there are provided operating ports and discharge ports on both sides.

Figure 2:
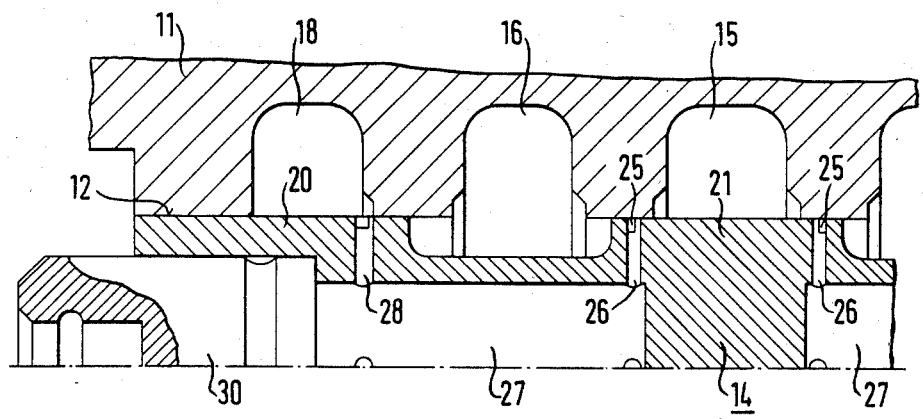

A preferred embodiment of the invention will now be described, by way of example, with reference to the accompanying drawings, in which:

FIG. 1 is a cross-section of a multi-way-valve including a spool member of the present invention;

FIG. 2 a cross-section of a portion of the spool member and the adjacent housing in an enlarged scale.

FIG. 1 discloses a multi-way-valve 10 having a housing 11 provided with a bore 12 slidably receiving a spool member 14. A central inlet port 15 is connected to a pressure fluid source (not shown), operating ports 16 and 17 are connected to a double acting fluid motor (not shown), and discharge ports 18, 19 outside of the operating ports 16 and 17 are connected to a reservoir (not shown). The spool member 14 is provided with three lands 20, 21, and 22 controlling the pressure fluid ports upon movement of the spool member.

The annular inlet port 15 connected to the pressure fluid source and the annular operating ports 16 and 17 are closed when the spool member is in its central position. During this time pressure fluid may leak from inlet port 15 through gaps between the spool member and the housing into one or both operating ports 16, 17 which may result in an undesired pressure increase at the fluid motor.

In order to prevent this, there are provided annular grooves 25 in the area of these gaps in the central land 21 of the spool member, which annular grooves 25 are connected to a blind bore 27 in the spool member via a radial bore 26. Alternatively, the annular groove may be provided in a housing land. The width of the annular grooves 25 may be smaller than the diameter of the radial bores 26. This is of advantage in view of the small land width.

The pressure fluid is discharged from the blind bore 27 via further radial bores 28 connected to discharge ports 18 and 19, respectively, when the spool member is in its central position. This may be seen from FIG. 2.

If spool member 14 is displaced from its central position to one of its operating positions, for example to the right as viewed in FIG. 2, in order to connect inlet port 15 to operating port 16, pressure fluid may flow via annular groove 25 and radial bores 26 into blind bore 27. Radial bores 28, however, are covered by the housing so that blind bore 27 is closed. If spool member 14 is displaced to the left in order to pressurize operating port 17, operating port 16, e.g. the other side of the fluid motor, is connected to discharge port 18, and blind bore 27 is depressurized.

Both blind bores in the spool member each are closed at their open end by a pin 30, in which a pushing member 31 is received, the pushing member 31 being guided in a sleeve 32. Pushing member 31 serves to actuate the spool member, e.g. by an armature (not shown) of a solenoid 33. Alternatively, the pushing member 31 may be mechanically, pneumatically or hydraulically operated.

What is claimed is:

1. A multi-way-valve comprising a valve housing having a bore formed therein intersected by a pressure port, an operating port, and a reservoir port, a valve spool slidably supported within said bore and having a pair of axially spaced lands with an interposed relief for selectively communicating said pressure port with said operating port or said operating port with said reservoir port, the improvement comprising a pair of annular grooves formed in said lands adjacent to said relief, a blind radially extending bore extending through said spool and radially extending passages extending from said annular grooves to said blind bore, said radially extending passages having a substantially greater diameter than the width of said annular grooves.

2. A multi-way-valve as set forth in claim 1 wherein there are a pair of operating ports formed in the housing on opposite sides of the pressure port and a pair of reservoir ports outwardly positioned from the operating ports, said spool having a further land thereon and a relief formed between said further land and a first of said lands for selectively communicating the pressure port with the other of the operating ports or the other of the operating ports with the other of the reservoir ports, there being further annular grooves formed on the other land and said one land, further radial passages extending from said grooves to a further blind bore formed in said valve spool.

* * * * *